United States Patent
Ramamoorthy et al.

(10) Patent No.: US 12,169,399 B2
(45) Date of Patent: Dec. 17, 2024

(54) METHOD AND SYSTEM FOR INFRASTRUCTURE MONITORING

(71) Applicant: Tata Consultancy Services Limited, Mumbai (IN)

(72) Inventors: Gopalakrishnan Ramamoorthy, Chennai (IN); Rajan Gurumurthy Pillay, Chennai (IN); Ninad Arun Date, Pune (IN); Shiva Tirumalasetty Santosh, Hyderabad (IN); Amit Chowdhery, Gurgaon (IN); Soumitra Mandal, Pune (IN); Swapneel Kore, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 415 days.

(21) Appl. No.: 17/654,315

(22) Filed: Mar. 10, 2022

(65) Prior Publication Data
US 2022/0342395 A1    Oct. 27, 2022

(30) Foreign Application Priority Data
Mar. 18, 2021    (IN) .............................. 202121011624

(51) Int. Cl.
*G05B 19/418*    (2006.01)
(52) U.S. Cl.
CPC ..................... *G05B 19/4184* (2013.01); *G05B 2219/50185* (2013.01)
(58) Field of Classification Search
CPC .................................................. G05B 19/4184
See application file for complete search history.

(56) References Cited

U.S. PATENT DOCUMENTS

| 10,140,164 B2 | 11/2018 | Mehta et al. |
| 10,558,544 B2 | 2/2020 | Arndt et al. |
| 2022/0092608 A1* | 3/2022 | Ruvini ............... G06Q 30/0609 |

OTHER PUBLICATIONS

Heruwidagdo, Ignatius Rahardjo et al., "Machine Learning Models to Predict Information Technology Infrastructure Performance", Procidia, Date: 2018, Publisher: Elsevier, https://www.researchgate.net/publication/349489595_Performance_of_Information_Technology_Infrastructure_Prediction_using_Machine_Learning/link/6095f8ed92851c490fc38dea/download.

(Continued)

*Primary Examiner* — Mark A Connolly
(74) *Attorney, Agent, or Firm* — Finnegan, Henderson, Farabow, Garrett & Dunner, LLP

(57) ABSTRACT

Traditional infrastructure monitoring systems have the disadvantage that they either fail to consider dependency between metrices or consider the dependency only at an abstract level, which adversely affects efficiency with which a performance assessment of the infrastructure being monitored can be carried out. Another disadvantage of the existing systems is that manual intervention is required at different stages of the infrastructure monitoring. The disclosure herein generally relates to infrastructure monitoring, and, more particularly, to a method and system for identifying correlation between metrices in the infrastructure. The system uses a hybrid correlation approach which considers determining a dominant correlation from among a direct correlation and a chained correlation that may exist between each pair of metrices being considered at a time for determining the correlation.

9 Claims, 4 Drawing Sheets

(56) References Cited

OTHER PUBLICATIONS

Matsunaga, Andréa et al., "On the Use of Machine Learning to Predict the Time and Resources Consumed by Applications", International Conference on Cluster, Cloud and Grid Computing, Date: 2010, Publisher: IEEE, http://homepages.cs.ncl.ac.uk/paolo.missier/doc/Matsunaga10.pdf.

Baughman, Matt et al., "Profiling and Predicting Application Performance on the Cloud", International Conference on Utility and Cloud Computing (UCC), Date: 2018, Publisher: IEEE, https://par.nst.gov/servlets/purl/10119474.

Elmasry, Mohamed, "Predict Network, Application Performance Using Machine Learning and Predictive Analytics", International Conference on Utility and Cloud Computing (UCC), Date: 2019, Publisher: Scholar Works, https://scholarworks.rit.edu/cgi/viewcontent.cgi?article=11195&context=theses#:~:text=Computer%20networking%20can%20utilize%20predictive.on%20historical%20data%20%5B2%5D.

Sulochana Ganapathi, Archana, "Predicting and Optimizing System Utilization and Performance via Statistical Machine Learning", Technical Report, Date: 2009, Publisher: Berkeley, http://www2.eecs.berkeley.edu/Pubs/TechRpts/2009/EECS-2009-181.pdf.

Liu, Yangguang et al., "A Strategy on Selecting Performance Metrics for Classifier Evaluation", International Journal of Mobile Computing and Multimedia Communications, Date: 2014, Publisher: Researchgate, https://www.researchgate.net/publication/291600681_A_Strategy_on_Selecting_Performance_Metrics_for_Classifier_Evaluation/link/60638ec08ea909241e1edc6e/download.

* cited by examiner

METHOD AND SYSTEM FOR INFRASTRUCTURE MONITORING

PRIORITY CLAIM

This U.S. patent application claims priority under 35 U.S.C. § 119 to Indian patent application No. 202121011624, filed on Mar. 18, 2021. The entire contents of the aforementioned application are incorporated herein by reference.

TECHNICAL FIELD

The disclosure herein generally relates to infrastructure monitoring, and, more particularly, to a method and system for identifying correlation between metrices in the infrastructure.

BACKGROUND

In any domain or field of application, infrastructure is built to provide basic physical and organizational structures and facilities needed for operation of an enterprise. In short, the infrastructure could refer to and cover all the components of a system or a network of systems required to support specific applications/needs. For example, if we consider an industrial plant, all the physical components of the industrial plant form part of the infrastructure. The infrastructure is built to support a certain load/capacity, and there are various parameters that are associated with any industrial process. In the industrial plant example, some of the parameters that may be associated with industrial systems/processes are, but not limited to, temperature, pressure, concentration of certain gases, processing load on individual components of the industrial plant, overall throughput of the industrial plant, and so on. Values of such parameters (metrices) can be monitored and used for performance assessment and for other such applications. Similarly if a computing system is being monitored, the metrices may be CPU utilization, memory usage, disk i/o, and network i/o and so on.

Most of such parameters/metrices are interdependent i.e., change in value of one parameter has impact on values of related parameters. Some of the state-of-the-art systems used for monitoring and performance assessment fail to capture and process such relations between the matrices, which adversely affects efficiency with which the performance assessment is being carried out. Another disadvantage of the existing systems is that manual intervention is required at different stages of the infrastructure monitoring.

SUMMARY

Embodiments of the present disclosure present technological improvements as solutions to one or more of the above-mentioned technical problems recognized by the inventors in conventional systems. For example, in one embodiment, a processor implemented method for infrastructure monitoring is provided. In this method, initially an infrastructure data is collected as input, via one or more hardware processors. Further, values of a plurality of metrices are extracted by processing the input data, via the one or more hardware processors. Further, correlation between the plurality of metrices are identified, via the one or more hardware processors. The correlation is identified for each pair of metrices, till the correlation of every metric with every other metric is determined. At this stage, the following steps are executed for each pair of metrices. Initially, value of a direct correlation is determined for the pair of metrices. Further, value of a chained correlation is determined for the pair of metrices. Further, one of the direct correlation and the chained correlation is determined as a dominant correlation, by comparing the determined values of the direct correlation and the chained correlation. The correlation with highest value from among the direct correlation and the chained correlation, for each pair of metrices, is determined as the dominant correlation. The value of the dominant correlation is then used to fill a correlation matrix, wherein the correlation matrix captures information on correlation between each pair of metrices in terms of value of the corresponding dominant correlation.

In another aspect, a system for infrastructure monitoring is provided. The system includes one or more hardware processors, a communication interface, and a memory operatively coupled to the one or more hardware processors via the communication interface. The memory stores a plurality of instructions, which when executed, causes the one or more hardware processors to initially collect infrastructure data as input. The system then extracts values of a plurality of metrices by processing the input data. The system further identifies correlation between the plurality of metrices. The system identifies the correlation of each metric with each other metric from among the plurality of metrices, by executing the following steps for each pair of metrices from among the plurality of metrices. The system initially determines value of a direct correlation for the pair of metrices. Further, the system determines value of a chained correlation for the pair of metrices. Further, the system determines one of the direct correlation and the chained correlation as a dominant correlation, by comparing the determined values of the direct correlation and the chained correlation. The system determines correlation with highest value from among the direct correlation and the chained correlation, for each pair of metrices, as the dominant correlation. The value of the dominant correlation is then used to fill a correlation matrix, wherein the correlation matrix captures information on correlation between each pair of metrices in terms of value of the corresponding dominant correlation.

In yet another aspect, a non-transitory computer readable medium for infrastructure monitoring is provided. The non-transitory computer readable medium includes a plurality of instructions, which when executed, causes one or more hardware processors to execute the following steps as part of the infrastructure monitoring. The non-transitory computer readable medium initially collects an infrastructure data as input, via one or more hardware processors. Further, values of a plurality of metrices are extracted by processing the input data, via the one or more hardware processors. Further, correlation between the plurality of metrices are identified, via the one or more hardware processors. The correlation is identified for each pair of metrices, till the correlation of every metric with every other metric is determined. At this stage, the following steps are executed for each pair of metrices. Initially, value of a direct correlation is determined for the pair of metrices. Further, value of a chained correlation is determined for the pair of metrices. Further, one of the direct correlation and the chained correlation is determined as a dominant correlation, by comparing the determined values of the direct correlation and the chained correlation. The correlation with highest value from among the direct correlation and the chained correlation, for each pair of metrices, is determined as the dominant correlation. The value of the dominant correlation is then used to fill a correlation matrix, wherein the correlation matrix captures information on correlation between each pair of metrices in terms of value of the corresponding dominant correlation.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Figure 1:
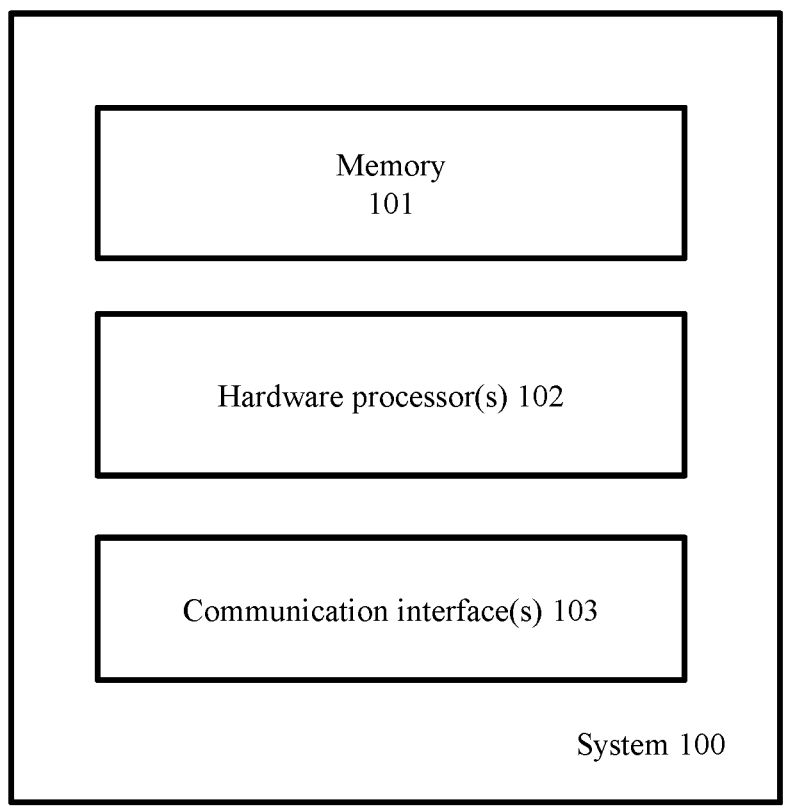
FIG. 1 illustrates an exemplary system for infrastructure monitoring, according to some embodiments of the present disclosure.
Figure 2:
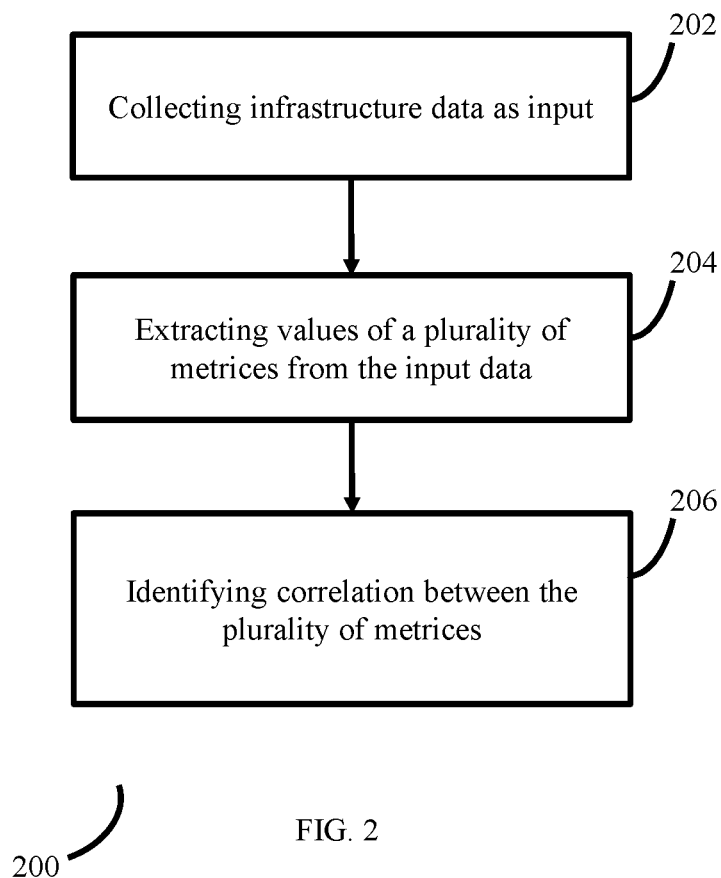
FIG. 2 is a flow diagram depicting steps involved in the method of infrastructure monitoring, by the system of FIG. 1, according to some embodiments of the present disclosure.
Figure 3:
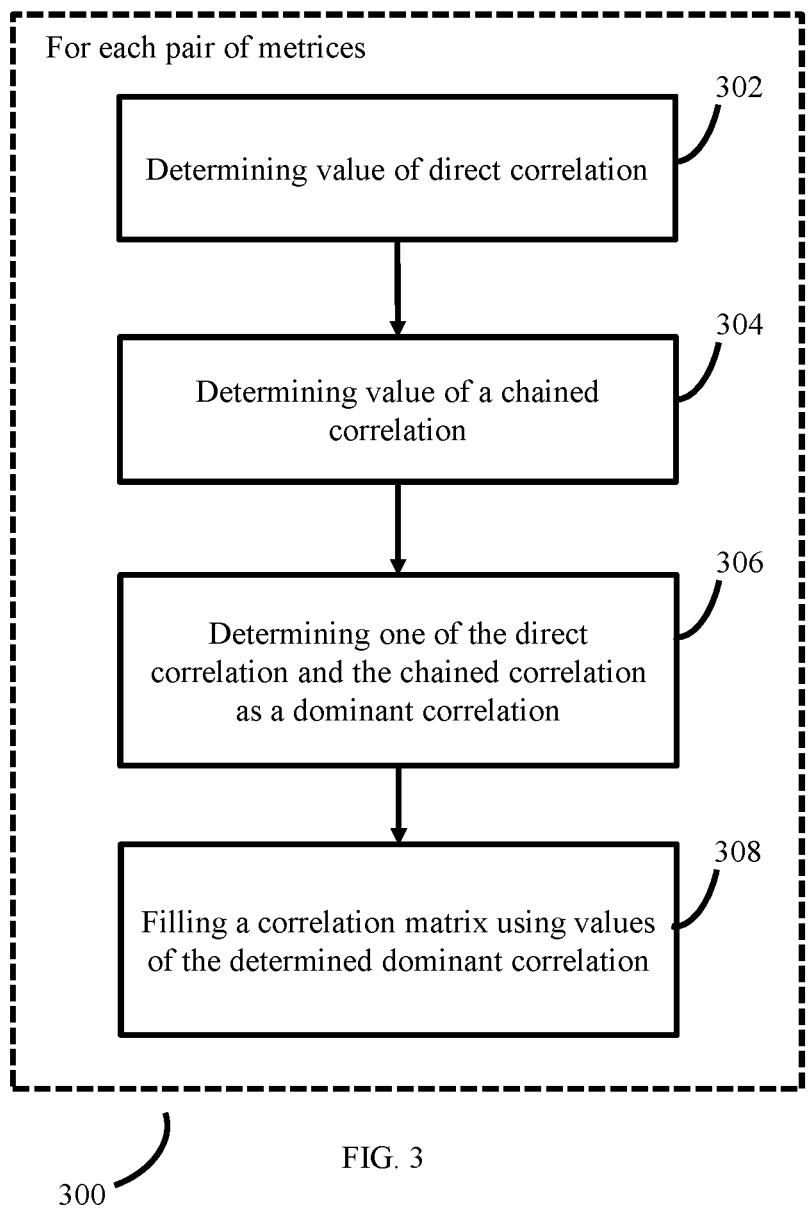
FIG. 3 is a flow diagram depicting steps involved in the method of determining correlation between metrices in each pair of metrices, by the system of FIG. 1, according to some embodiments of the present disclosure.

Referring now to the drawings, and more particularly to FIG. 1 through FIG. 3, where similar reference characters denote corresponding features consistently throughout the figures, there are shown preferred embodiments and these embodiments are described in the context of the following exemplary system and/or method.

The system 100 includes one or more hardware processors 102, communication interface(s) or input/output (I/O) interface(s) 103, and one or more data storage devices or memory 101 operatively coupled to the one or more hardware processors 102. The one or more hardware processors 102 can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The communication interface(s) 103 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the communication interface(s) 103 can include one or more ports for connecting a number of devices to one another or to another server.

The memory 101 may include any computer-readable medium known in the art including, for example, volatile memory, such as static random-access memory (SRAM) and dynamic random access memory (DRAM), and/or non-volatile memory, such as read only memory (ROM), erasable programmable ROM, flash memories, hard disks, and optical disks. In an embodiment, one or more components (not shown) of the system 100 can be stored in the memory 101. The memory 101 is configured to store a plurality of operational instructions (or 'instructions') which when executed cause one or more of the hardware processor(s) 102 to perform various actions associated with the process of infrastructure monitoring being performed by the system 100. The system 100 can be implemented in a variety of ways as per requirements. Various steps involved in the process of infrastructure monitoring being performed by the system 100 of FIG. 1 are depicted in FIG. 2 and FIG. 3, and are explained with reference to the hardware components depicted in FIG. 1.

FIG. 2 is a flow diagram depicting steps involved in the method of infrastructure monitoring, by the system of FIG. 1, according to some embodiments of the present disclosure. In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in FIG. 1 and the steps of flow diagram as depicted in FIG. 2 and FIG. 3. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 202 of the method 200, the system 100 collects infrastructural data as input. The infrastructural data may be specific to domain/infrastructure being monitored and contains various parameters/metrices that individually or in combination represent various characteristics of the infrastructure being monitored. The system 100 may use appropriate sensors for monitoring and collecting values of the metrices. Number of each of the sensors also may vary as per requirements. A few examples of such metrices are given below:

1. If performance of CPU in a computing system is to be determined, some of the parameters affecting performance of the CPU are:
   Architecture (For example, ARM64)
   Number of Cores
   Percentage utilization
2. If memory performance is to be assessed, at least the following parameters can be assessed:
   Free bytes
   Active/cached bytes The system 100 may pre-process the collected input data. Pre-processing the data may involve steps such as but not limited to removing noise and other unnecessary components from the collected data, converting the data to a specific format for further processing, removing outliers of the data and so on. The system 100 may use any appropriate mechanism/technique for pre-processing the input data. For example, the system 100 may use a Gaussian distribution based approach for removing the outliers from the input data.

Further, at step 204, the system 100 identifies all the metrics that are part of the input data collected, and extracts value of each of the metrics. The system 100 may identify the metrics by detecting specific keywords (such as CPU, usage, memory and so on) in the input data, in reference to a terms specified in a reference database, and can then identify and extract value of each of the metrics from the input data.

Further, at step 206, the system 100 identifies correlation between the plurality of metrics extracted at step 204. Various steps executed by the system 100 to identify the correlation are depicted in FIG. 3 and are explained below.

Each metric may be having correlation with one or more other metrics. The method 300 is used by the system 100 to identify correlation of each of the metrics with every other metric from among the plurality of metrics. The system 100 considers a pair of two metrics (a first metric and a second metric) at a time, and executes steps in the method 300 to determine correlation between the first metric and the second metric.

Figure 4A:
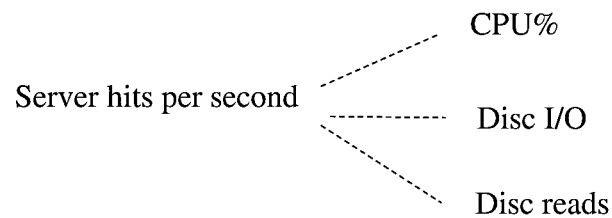
FIG. 4A and FIG. 4B are exemplary representations of a direct correlation and a chained correlation respectively, according to some embodiments of the present disclosure.

At step 302 of the method 300, the system 100 determines value of a direct correlation of the first metric and the second metric in the pair, wherein presence of direct correlation between the first metric and the second metric indicates that the second metric is affected for any change in the first metric. For example, the metric 'user hits per second', directly impacts metrices such as but not limited to CPU %, disk I/O, and number of disc reads, and hence the metrices CPU %, disk I/O, and number of disc reads have direct correlation with the metric. Example of the direct correlation is depicted in FIG. 4A.

The system 100 determines value of the direct correlation as:

$$r = \frac{\sum (x_i - \bar{x})(y_i - \bar{y})}{\sqrt{\sum (x_i - \bar{x})^2 \sum (y_i - \bar{y})^2}}$$

Figure 4B:
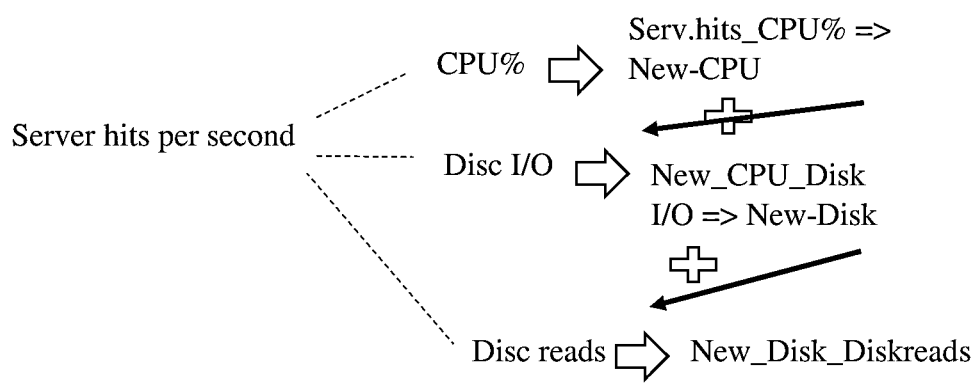

Where,
r=correlation coefficient
$X_i$=value of x variable (i.e. first metric) in sample
$\bar{X}$=mean of values of the x-variable
$Y_i$=value of y variable (i.e. second metric) in sample
$\bar{Y}$=mean of values of the y-variable At step 304, the system 100 determines value of a chained correlation between the first metric and the second metric in the pair. The chained correlation is assessed/determined by considering indirect relation between the metrices. The aforementioned equation can be used for determining the value of the chained correlation as well, as only the way values are selected is changing. For example, consider the example as depicted in FIG. 4B.

As depicted in the example figure above, while the chained correlation is determined/calculated, the system 100 considers complete data, but hierarchy is taken forward by newly predicted features, instead of old ones. In the given example, the CPU % is predicted from Serv.hits_CPU % model, but subsequently the Disk I/O was predicted from New_CPU_Disk I/O model.

Further, at step 306, the system 100 determines one of the calculated direct correlation and the chained correlation as a dominant correlation. The system 100 determines the dominant correlation by comparing values of the direct correlation and the chained correlation, for each pair of metrices, and by taking the correlation having highest value between the direct correlation and the chained correlation as the dominant correlation.

Further, at step 308, the system 100 fills a correlation matrix using value of the determined dominant correlation of all the pairs of matrices. The correlation matrix that contains the values of dominant correlation of all pairs of matrices from among the plurality of matrices extracted from the input data represent correlation between the matrices.

The data in the correlation matrix can be further used for various applications. For example, given value of one of the matrices, values of associated matrices can be determined/calculated based on the correlation specified in the correlation matrix. The correlation data captured in the correlation matrix can be also used to select the pair of features/metrices which are used train a machine learning model, which can then be used for generating predictions with respect to values of matrices For example, consider that for the pair (server hits/sec, cpu %) the dominant correlation value is determined as 0.95, and for the pair (Disk i/o, cpu %) the dominant correlation value is determined as 0.90. Now, the Pair (Server hits/sec, cpu %) can be used to train the model to predict value of (cpu %), since dominant correlation of pair (server hits/sec, cpu %) is greater among both.

The correlation metric can also be used for performing a what-if analysis. The what-if analysis involves determining load on at least one infrastructure component for a specific amount of user traffic, based on information in the correlation matrix. As the correlation matrix contains information on various metrices that may be affected due to change in the user traffic metric, this information is used by the system 100 to calculate/determine load on one or more infrastructure components for the given user traffic. The determined load is then compared with a corresponding threshold of capacity. Load exceeding the threshold of capacity may result in component failure. Hence, upon determining such a possible component failure scenario by performing the what-if analysis, the system 100 may generate a plurality of recommendations to scale-up capacity of the at least one infrastructure component.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of infrastructure monitoring. The embodiment thus provides a mechanism to determine correlation between different metrices in data collected via the infrastructure monitoring. Moreover, the embodiments herein further provide a mechanism to predict values of one or more of the metrices based on the determined correlation.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for infrastructure monitoring, comprising:
   collecting infrastructure data as input, via one or more hardware processors;
   extracting values of a plurality of metrices by processing the input data, via the one or more hardware processors;
   identifying correlation between the plurality of metrices, via the one or more hardware processors, comprising:
      for each pair of metrices from among the plurality of metrices:
         determining a value of a direct correlation;
         determining a value of a chained correlation;
         determining one of the direct correlation and the chained correlation as a dominant correlation, by comparing the determined values of the direct correlation and the chained correlation; and
         filling a correlation matrix using the value of the dominant correlation, wherein the correlation matrix captures information on correlation between each pair of metrices in terms of the dominant correlation.

2. The method as claimed in claim 1, wherein the correlation matrix is used for determining values of one or more metrices, wherein determining the values of the one or more metrices using the correlation matrix comprising:
   collecting a metric as input;
   determining one or more metrices correlated with the metric collected as input, based on data in the correlation metric; and
   determining values of the one or more metrices, based on value of the metric collected as input.

3. The method as claimed in claim 1, wherein the correlation metric is used for performing a what-if analysis, comprising:
   determining load on at least one infrastructure component for a specific amount of user traffic, based on information in the correlation matrix;
   determining whether the determined load on the at least one infrastructure component is exceeding a threshold of capacity; and
   generating a plurality of recommendations to scale-up capacity of the at least one infrastructure component, if the determined load is found to have exceeded the threshold of capacity.

4. A system for infrastructure monitoring, comprising:
   one or more hardware processors;
   a communication interface; and
   a memory operatively coupled to the one or more hardware processors via the communication interface, wherein the memory storing a plurality of instructions, which when executed, causes the one or more hardware processors to:
      collect infrastructure data as input;
      extract values of a plurality of metrices by processing the input data;

identify correlation between the plurality of metrices, comprising:

for each pair of metrices from among the plurality of metrices:
- determining a value of a direct correlation;
- determining a value of a chained correlation;
- determining one of the direct correlation and the chained correlation as a dominant correlation, by comparing the determined values of the direct correlation and the chained correlation; and
- filling a correlation matrix using the value of the dominant correlation, wherein the correlation matrix captures information on correlation between each pair of metrices in terms of the dominant correlation.

5. The system as claimed in claim 4, wherein the system uses the correlation matrix to determine values of one or more metrices, by:
- collecting a metric as input;
- determining one or more metrices correlated with the metric collected as input, based on data in the correlation metric; and
- determining values of the one or more metrices, based on value of the metric collected as input.

6. The system as claimed in claim 5, wherein the system performs a what-if analysis using the correlation metric, by:
- determining load on at least one infrastructure component for a specific amount of user traffic, based on information in the correlation matrix;
- determining whether the determined load on the at least one infrastructure component is exceeding a threshold of capacity; and
- generating a plurality of recommendations to scale-up capacity of the at least one infrastructure component, if the determined load is found to have exceeded the threshold of capacity.

7. One or more non-transitory machine-readable information storage mediums comprising one or more instructions which when executed by one or more hardware processors cause:
- collecting infrastructure data as input;
- extracting values of a plurality of metrices by processing the input data;
- identifying correlation between the plurality of metrices, comprising:
  - for each pair of metrices from among the plurality of metrices:
    - determining a value of a direct correlation;
    - determining a value of a chained correlation;
    - determining one of the direct correlation and the chained correlation as a dominant correlation, by comparing the determined values of the direct correlation and the chained correlation; and
    - filling a correlation matrix using the value of the dominant correlation, wherein the correlation matrix captures information on correlation between each pair of metrices in terms of the dominant correlation.

8. The one or more non-transitory machine-readable information storage mediums of claim 7, wherein the correlation matrix is used for determining values of one or more metrices, wherein determining the values of the one or more metrices using the correlation matrix comprising:
- collecting a metric as input;
- determining one or more metrices correlated with the metric collected as input, based on data in the correlation metric; and
- determining values of the one or more metrices, based on value of the metric collected as input.

9. The one or more non-transitory machine-readable information storage mediums of claim 7, wherein the correlation metric is used for performing a what-if analysis, comprising:
- determining load on at least one infrastructure component for a specific amount of user traffic, based on information in the correlation matrix;
- determining whether the determined load on the at least one infrastructure component is exceeding a threshold of capacity; and
- generating a plurality of recommendations to scale-up capacity of the at least one infrastructure component, if the determined load is found to have exceeded the threshold of capacity.

* * * * *